(12) United States Patent
Andritsos et al.

(10) Patent No.: US 8,926,219 B2
(45) Date of Patent: Jan. 6, 2015

(54) DEVICE FOR COLLECTING AND TEMPORARILY STORING FLUIDS FROM AN UNDERWATER SOURCE

(75) Inventors: Fivos Andritsos, Gavirate (IT); Panagiotis Sotiropoulos, Patras (GR)

(73) Assignee: The European Union, Represented by the European Commission, Brussels (BE)

( * ) Notice: Subject to any disclaimer, the term of this patent is extended or adjusted under 35 U.S.C. 154(b) by 0 days.

(21) Appl. No.: 14/344,653

(22) PCT Filed: Sep. 14, 2012

(86) PCT No.: PCT/EP2012/068142
§ 371 (c)(1),
(2), (4) Date: Mar. 13, 2014

(87) PCT Pub. No.: WO2013/037968
PCT Pub. Date: Mar. 21, 2013

(65) Prior Publication Data
US 2014/0356068 A1   Dec. 4, 2014

(30) Foreign Application Priority Data
Sep. 16, 2011 (EP) .................................... 11181618

(51) Int. Cl.
*E02B 15/04* (2006.01)
*E21B 43/01* (2006.01)
*E02B 1/00* (2006.01)

(52) U.S. Cl.
CPC ............... *E21B 43/0122* (2013.01); *E02B 1/00* (2013.01); *E02B 2201/00* (2013.01); *Y10S 210/923* (2013.01)

USPC ............................................. 405/60; 210/923

(58) Field of Classification Search
CPC ...... B63C 7/006; E21B 43/0122; E21B 43/36
USPC ................. 405/60, 64, 66; 210/922, 923, 924
See application file for complete search history.

(56) References Cited

U.S. PATENT DOCUMENTS 3,674,150 A * 7/1972 Lejeune ......................... 210/245
3,745,773 A * 7/1973 Cunningham ................... 405/60
(Continued)

FOREIGN PATENT DOCUMENTS

| EP | 1524186 A1 | 4/2005 |
| FR | 2853673 A1 | 10/2004 |

(Continued)

*Primary Examiner* — Benjamin Fiorello
(74) *Attorney, Agent, or Firm* — Nath, Goldberg & Meyer; Jerald L. Meyer; Katelyn J. Bernier

(57) ABSTRACT

A device (10) for collecting and temporarily storing fluids (16) escaping from an underwater source (12, 64) and having lower density than surrounding water includes a collector (18) placed over the underwater source for collecting the escaping fluids, a riser tube (20) for transferring the collected fluids together towards the surface; and a buoyant buffer reservoir (22) maintained submerged under the surface and having an open-bottom chamber (30) for storage of the fluids. The riser tube has flow restrictors has flow restrictors comprising choke disks (58, 58') arranged in its interior for restricting the flow of the fluids. The flow restrictors are arranged along the length of the riser tube. The buffer reservoir has arranged in its chamber a separator vessel (32) for separating gas from the fluids. The riser tube opens into the interior of the separator for discharging the fluids.

17 Claims, 5 Drawing Sheets

(56) References Cited

U.S. PATENT DOCUMENTS

| | | | |
|---|---|---|---|
| 4,358,218 A * | 11/1982 | Graham | 405/60 |
| 4,395,157 A | 7/1983 | Cunningham | |
| 4,449,850 A * | 5/1984 | Cessou et al. | 405/60 |
| 5,213,444 A * | 5/1993 | Henning | 405/63 |
| 5,402,821 A | 4/1995 | Harstad | |
| 8,173,012 B1 * | 5/2012 | Che | 210/170.05 |
| 2011/0318106 A1 * | 12/2011 | Gateff et al. | 405/60 |
| 2011/0318108 A1 * | 12/2011 | Wolinsky | 405/64 |
| 2012/0070231 A1 * | 3/2012 | Al-Sharif | 405/60 |

FOREIGN PATENT DOCUMENTS

| | | |
|---|---|---|
| GB | 2063776 A | 6/1981 |
| GB | 2066095 A | 7/1981 |
| GB | 2071020 A | 9/1981 |
| GB | 2337011 A | 11/1999 |
| WO | 8101310 A1 | 5/1981 |

* cited by examiner

DEVICE FOR COLLECTING AND TEMPORARILY STORING FLUIDS FROM AN UNDERWATER SOURCE

This is a National Phase Application filed under 35 U.S.C. 371 as a national stage of PCT/EP2012/068142, filed Sep. 14, 2012, and claims priority benefit from European Application No. 11181618.7, filed Sep. 16, 2011, the content of each of which is hereby incorporated by reference in its entirety.

TECHNICAL FIELD

The present invention generally relates to a device for capturing fluids lighter than water escaping from an underwater source. The device is particularly useful for collecting and temporarily storing oil and/or gas escaping from an out-of-control deep-sea borehole. Additionally, the device could be used to capture pollutants, such as e.g. oil, oil products or chemical products, leaking from sunken tankers.

BACKGROUND ART

European Patent 1 524 186 discloses a device for collecting fluids having a density lower than that of the surrounding water and escaping from an underwater source. The device comprises an inverted-funnel-shaped dome placed over the underwater source for collecting the fluids escaped from the source and rising therefrom due to buoyancy. A transfer tube has a lower end in communication with the dome for transferring the collected fluids towards the surface. The device further comprises a submerged buffer reservoir, which is maintained at a predetermined depth under the surface, the submerged buffer reservoir being in communication with an upper end of the transfer tube for receiving the collected fluids. In the chamber of the submerged buffer reservoir, water will separate from the collected fluid due to the different densities, so that the submerged buffer reservoir acts as a separator, which concentrates the fluids in the upper part of the chamber.

U.S. Pat. No. 4,395,157 discloses an offshore drilling and pumping platform. The document shows collecting means in the form of an inverted funnel placed over an underwater oil and gas source, a riser tube for transferring the collected fluids towards a buffer reservoir maintained at the surface. The buffer reservoir comprises a chamber with an open bottom, into which the riser tube opens with its upper end. Gas is separated from oil in the buffer reservoir. GB 2066095 discloses a device for the recovery of fluids from underwater leaks. The device comprises a collection bell disposed above an underwater well, an open-bottom container arranged above the collection bell for storing the fluids and a riser, which reaches from the top of the collection bell into the interior of the container. At the upper end of the riser, a spiral flow channel is arranged for promoting the separation of the different phases of the fluids.

Document GB 2071020 relates to an apparatus for capturing and storing oil and gas flowing uncontrollably from an offshore well. The apparatus comprises an underwater liquid-gas separator to be positioned above a sea floor well blowout. Gas and oil is stored within a floatable storage vessel with an open bottom. Gas and oil are transported separately from the separator to the storage vessel, via an oil hose and a gas hose, respectively.

Document WO 81/01310 criticizes collecting means in the shape of sombreros (or inverted funnels), stating that it is difficult to transfer the mixture of oil and gas to the surface because of the proportional expansion of the escaping gas and pressure fluctuations due to gas bubbles. To address that problem, WO 81/0310 proposes to arrange a separator column on the seabed and to evacuate oil and gas though separate riser tubes.

The device disclosed in EP 1 524 186 has the advantage that it may be relatively easily installed above an underwater source. However, modifications to the system are necessary to enable it to deal with underwater sources releasing substantial amounts of gas, e.g. a borehole gone out of control, like the Mocondo well in the Gulf of Mexico in 2010. Indeed, as indicated by WO 81/01310, the expansion of the gas could destabilise the flow of the collected fluids up the riser tube. Nevertheless, a separation of the gas content from the other fluids at the seabed is undesirable, since it makes the system on the seabed more complicated. Valuable time may be lost in case of a blowout if a separator column as disclosed in WO 81/0310 must be put in place.

Technical Problem

It is an object of the present invention to provide an improved device for collecting and temporarily storing fluids rising from an underwater source, in particular with respect to the device's ability to handle fluids containing gas. This object is achieved by a device as claimed in claim 1.

General Description of the Invention

According to the invention, a device for collecting and temporarily storing fluids escaping from an underwater source and having lower density than surrounding water comprises:
- a collector, e.g. a deployable inverted funnel, for being placed over the underwater source for collecting the fluids escaping from the underwater source;
- a riser tube having a lower end in communication with the collector for transferring the collected fluids together towards the surface; and
- a buoyant buffer reservoir configured for being maintained submerged at a predetermined depth under the surface, the buffer reservoir comprising a chamber with an open bottom for storage of the fluids transferred by the riser tube.

The riser tube has flow restrictors comprising choke disks, arranged in its interior for restricting the flow of the fluids. The flow restrictors, which are arranged at regular or variable intervals all along the length of the riser tube, reduce the velocity of the fluids. Furthermore, the buffer reservoir has arranged in its chamber a separator vessel, into the interior of which the riser tube opens with its upper end for discharging the collected fluids. The separator vessel is configured for separating gas from the fluids discharged by the riser tube, e.g. as an oil/gas separator.

The invention is especially suited for collecting gas-containing fluids from underwater sources located at depths greater than 100 m, preferably greater than 200 m, below the sea level. As those skilled will appreciate, thanks to the invention, gas-containing fluids may be transferred from the seabed to the underwater buffer reservoir, without requiring separation of the gas fraction at the seabed. This greatly simplifies the structure to be deployed over the underwater source.

The device according to the invention may be used for prompt containment of deep sea off-shore well blowouts (like the 2010 Macondo well blowout in the Gulf of Mexico), collecting the leaking hydrocarbons (oil and gas) right at the seabed and separating the gas from the oil underwater, until a permanent solution (typically through side drills) is implemented, thus preventing dispersion of hydrocarbons on the sea surface and the resulting extended environment pollution. In addition, the device according to the invention could be used for the collection of natural gas from naturally occurring underwater methane sources (underwater methane volcanoes) for subsequent storage and exploitation with beneficial economic and environmental effects (methane is 20 times worse than $CO_2$ in terms of greenhouse effect).

When the device is in use, collected fluids are transferred to the submerged buffer reservoir, and not directly to the surface. In use, the collected fluid rises into the tube and penetrates into the chamber, where it accumulates. The buffer reservoir will thus store the fluids until it is emptied e.g. by a shuttle ship. Depending on the quantities of fluid leaking from the underwater source, the flow of fluid into the buffer reservoir may be continuous or not. So, as the fluid accumulates in the chamber, it also gradually replaces the initial, heavier water content of the chamber, which is expelled via the open bottom. In the chamber of the submerged buffer reservoir, the water will separate from the fluid due to the difference in specific weight, so that the submerged buffer reservoir also acts like a separator, which concentrates the fluids in the upper part of the submerged buffer reservoir. The gas content of the fluids is separated from the liquid fraction in the separator vessel, and, possibly, in the open-bottom storage chamber. The device preferably comprises one or more gas offtakes (each equipped with a gas evacuation valve) to (preferably continuously) remove the gas from the separator vessel and the chamber before it accumulates to too high an extent. The one or more offtakes are preferably connected to a gas holder (external to the submerged buffer reservoir) and/or a flare, so that gas can be collected or flared.

As the collected fluid is stored underwater, the fluid recovery procedure is almost completely independent of the weather conditions. Furthermore, there is no need for a surface platform or a pumping ship to be permanently installed at the vertical of the wreck for the collecting procedure.

The collector preferably comprises a deployable inverted funnel that has an apex opening to which the fluids escaping from the underwater source converge, and which is connected to the lower end of the riser tube.

The riser tube preferably has an inner diameter of at least 0.6 m, preferably of at least 1 m. Still more preferably, the inner diameter is comprised in the range from 1.5 m to 2.5 m.

Those skilled will appreciate that the device according to the invention is especially suited for collecting oil, gas etc. escaping from deep-sea sources. Accordingly, the riser tube has a length of at least 100 m, preferably of at least 200 m, and even more preferably of at least 400 m.

The buoyant buffer reservoir is preferably arranged at a predetermined depth under the sea surface that is comprised in the range from 20 m to 60 m, preferably in the range from 30 m to 50 m. This is considered sufficient for the submerged buffer reservoir not to be affected by weather-induced sea conditions. The buffer reservoir is also normally sufficiently deep to avoid collision with ships cruising in the area while being still easily accessible for recovering the stored fluid.

As indicated above, the flow restrictors comprise choke disks, i.e. perforated disks with multiple perforations restricting the cross section available for the flow to the area of the perforations. There may be one or more choke disks per flow restrictor.

The riser tube preferably comprises a plurality of tube modules joined to one another by connectors. Advantageously, the flow restrictors are arranged on the connectors.

According to a preferred embodiment of the invention, the tube modules are made of polyethylene. The connectors are preferably made of steel.

Preferably, a plurality of anchors (e.g. suction anchors, dead weight blocks or free-falling torpedo-shaped anchors) for anchoring the collector to the ground are distributed at the periphery of the collector. The anchors allow keeping the collector over the underwater source in a predetermined position allowing a good fluid recovery. The anchors are preferably regularly distributed around the periphery of the collector in order to distribute the tensioning stresses approximately equally among the mooring lines (chains or cables, preferably synthetic, high-strength ropes) that connect the collector to the anchors. It is worthwhile noting that buoyancy of the buffer reservoir thus maintains the entire device for collecting and temporarily storing fluids under tension and keeps it in place. The buoyancy of the buffer reservoir thus plays a structural role in maintaining the system upright, but nevertheless sufficiently flexible to exhibit resiliency in case of difficult current conditions.

The connectors preferably comprise a plurality of mooring line guides regularly distributed about their circumference. The mooring lines may thus be passed along the riser tube and fixed to the buoyant buffer reservoir. The connectors are preferably rigid and arranged at regular intervals along the riser tube. The length of the tube modules (and the distance between two consecutive connectors) is advantageously comprised in the range from 10 m to 50 m. The length of the tube modules may be varied along the length of the riser tube, in accordance with deployment considerations.

Preferably, at least one of said flow restrictors comprises a valve, the valve comprising a first and a second perforated disk arranged coaxially with each other (and preferably also with the riser tube) in the riser tube. At least one of the disks is rotatable about the common axis with respect to the other disk in such a way that the overlap of the perforations of the first and the second disk, respectively, can be varied. Most preferably, the at least one rotatable disk comprises an actuator, which is accessible from the outside of the tube (e.g. by an ROV) and manipulation of which allows rotating the disk. Alternatively, the actuator is a remotely controlled actuator (e.g. a servodrive, a pneumatic or a hydraulic actuator).

BRIEF DESCRIPTION OF THE DRAWINGS

Further details and advantages of the present invention will be apparent from the following detailed description of a not limiting embodiment with reference to the attached drawings, wherein.

DESCRIPTION OF PREFERRED EMBODIMENTS

Figure 1:
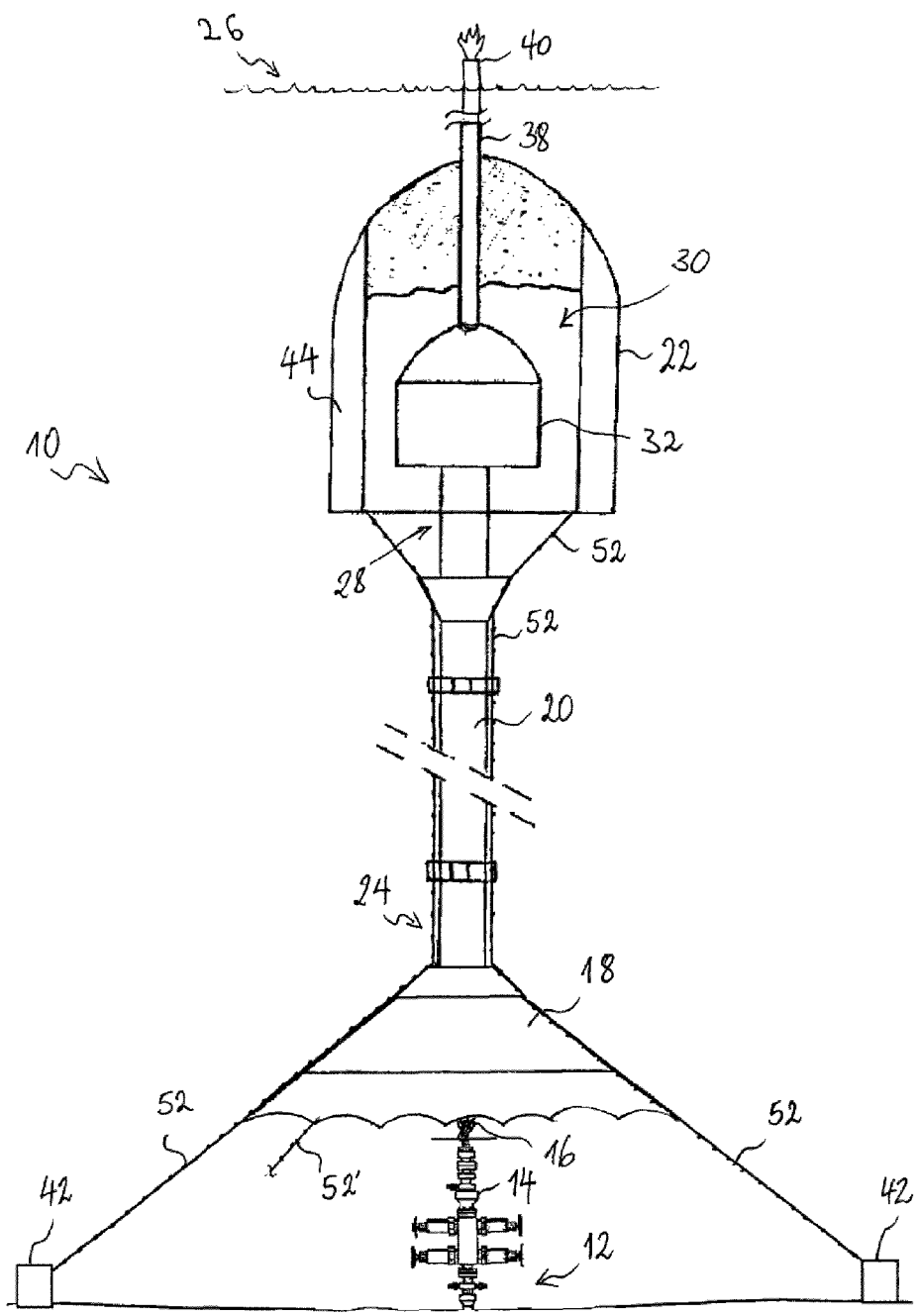
FIG. 1 is a schematic view of the device according to a preferred embodiment of the invention.

FIG. 1 shows a preferred embodiment of a device 10 for collecting fluids in accordance with the invention. Reference sign 12 indicates an underwater borehole with a failed blow-out preventer stack 14. A slurry 16 of oil gas and water is projected upwardly from the borehole 12.

Figure 2:
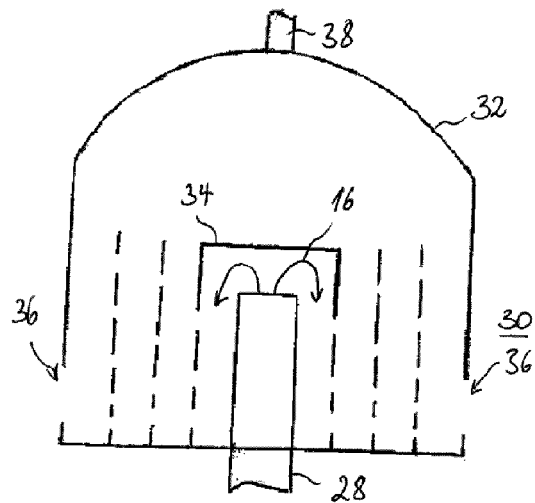
FIG. 2 is a schematic view of the separator vessel of the device of FIG. 1.

The device 10 comprises a collector in form of a deployable inverted funnel 18, a riser tube 20 and a buoyant underwater buffer reservoir 22. The lower end 24 of the riser tube 20 is connected to an apex opening of the inverted funnel 18. Under the action of buoyancy, the fluids escaping from the borehole 12 converge to the funnel apex and enter the riser tube 20, wherein they ascend towards the sea surface 26. The upper end 28 of the riser tube extends into the open-bottom chamber 30 of the buffer reservoir 22, in which chamber it is connected to an oil/gas separator vessel 32. As best illustrated in FIG. 2, the mixture of oil, gas and water that is discharged into the separator vessel 32 by the riser tube 20 is deviated into a maze 34, e.g. by a baffle 34, wherein gas separates from the mixture and rises to the top of the separator vessel 32. Oil and water leave the separator vessel 32 through openings 36 at the bottom of the separator vessel 32 and enter the open-bottom chamber 30 of the buffer reservoir 22. In the chamber 30, residual gas, water and oil segregate further, the gas and oil fractions moving up, the water fraction moving down. As oil and gas accumulate in the chamber 30, they replace the initial seawater content, which is forced out through the open bottom. Gas accumulating in the upper portions of the separator vessel and the chamber 30 is evacuated, via a gas uptake 38 and a relief valve (not shown), to a flare 40 at the sea surface, where the gas is burnt off. Instead of burning the gas, it could also be led into a buoyant gas holder.

The collected fluids are not directly channelled to the surface 26 but stored in the submerged buffer reservoir 32 at a given depth, e.g. at 30 to 50 m below the sea surface (the distance is measured between the sea surface and the top of the reservoir). The recovery of the leaking oil and gas is thus not affected by weather conditions and particularly not affected by rough weather, which would otherwise hinder the recovery procedure.

As shown in FIG. 1, the inverted funnel 18 is anchored to the seabed around the borehole 12 at several points, using anchors 42 (dead weight blocks or suction anchors, depending on the seabed).

Referring more specifically to the structure of the buffer reservoir 22, it is advantageously designed so as to fulfil the function of a terminal buoy, in order to control the tension on the riser tube 20. This is achieved using one or more ballast tanks 44.

The submerged buffer reservoir is advantageously provided with a drainage port (not shown) for connection e.g. to a shuttle tanker for emptying the chamber 30. The drainage port may consist of standard equipment through which the shuttle tanker, weather permitting, can recuperate the stored oil and/or gas rapidly, using standard offshore loading equipment and methods, typically by pumping. The frequency of emptying operations will depend on the prevailing weather and currents and on the leakage rate of the hydrocarbons.

The device 10 should be kept in place until a permanent solution, e.g. a side drill, has been implemented and the borehole 12 has been successfully clogged.

Figure 3:
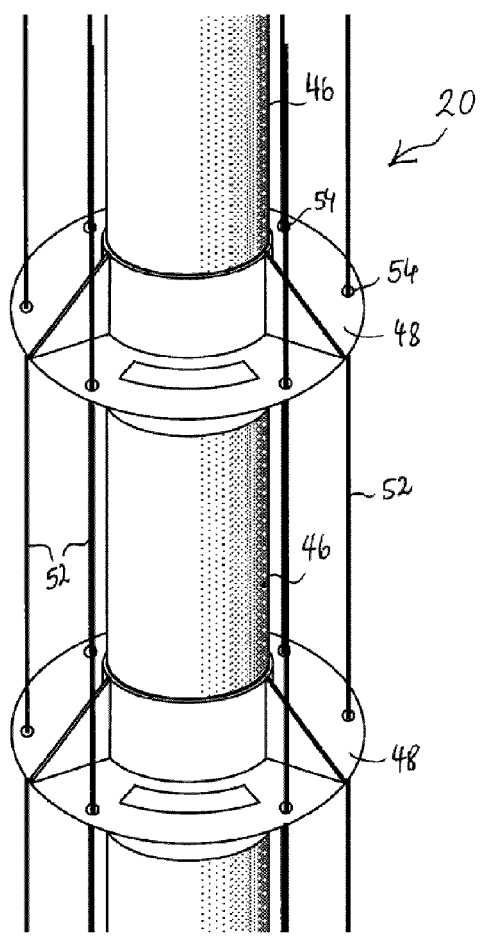
FIG. 3 is a perspective view of a riser tube portion.

The dimensions of the riser tube 20 and the submerged buffer reservoir 22 should be chosen in accordance with the maximum expected leakage rate, the expected weather as well as the sea current patterns. The riser tube 20 is preferably of modular construction, as best illustrated in FIG. 3. In the illustrated example, the riser tube 20 consists of tube modules 46, preferably made of polyethylene, which are interconnected by connectors 48. Tension along the riser tube 20 is transferred via the mooring lines 52, which are guided substantially parallel to the riser tube 20 by means of mooring line guides 54 disposed on the middle stabilizing ring 50 of each connector 48. In the illustrated embodiment, the riser tube has a diameter of 2 m and a wall thickness of 77 mm. The mooring lines are preferably synthetic, high-strength cables (e.g. made of Dyneema™ fibres) and may have a diameter of about 10 cm.

Figure 4:
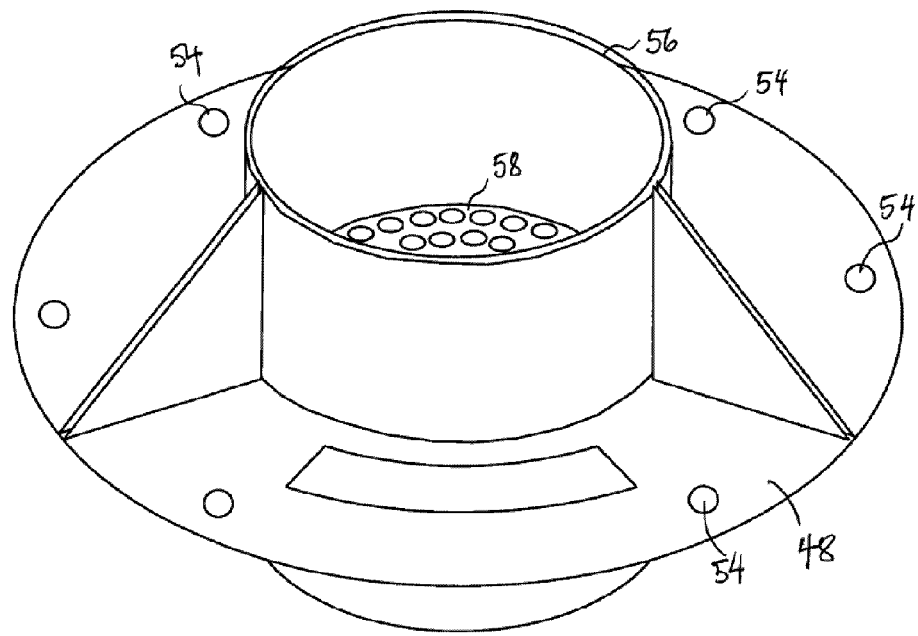
FIG. 4 is a perspective view of a connector for connecting two consecutive tube modules.
Figure 5:
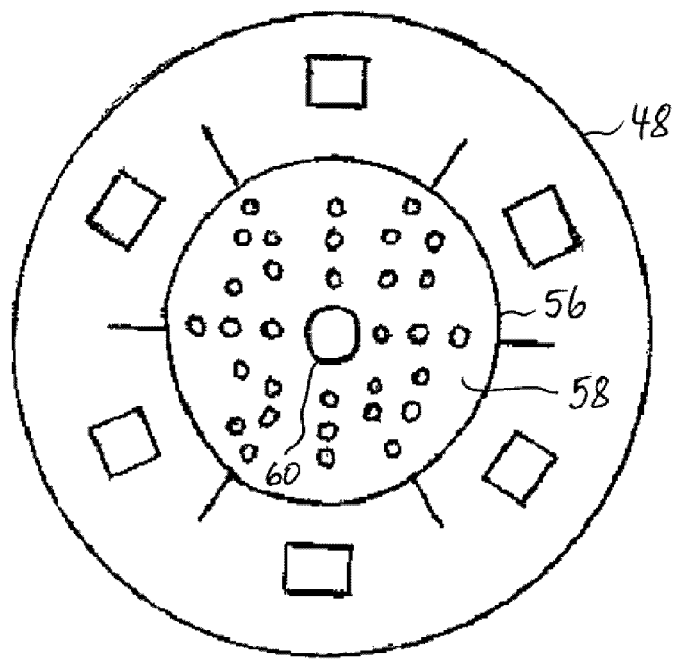
FIG. 5 is a schematic top view of a first variant of the connector of FIG. 4.
Figure 6:
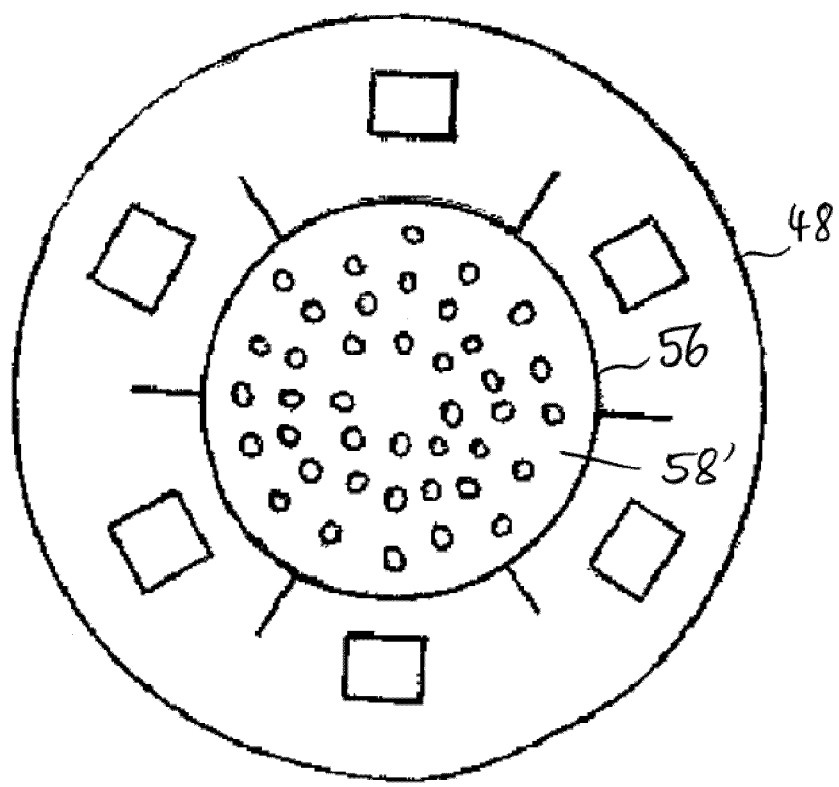
FIG. 6 is a schematic top view of a second variant of the connector of FIG. 4.

As shown in FIGS. 4 to 6, the connectors 48 comprise a circular cylindrical sleeve portion 56, which receives therein the end portions of the tube modules 46 to be connected together. A flow restrictor, in form of a perforated disk 58 (best shown in FIGS. 5 and 6) is arranged in the middle of the sleeve portion 56. The flow restrictors 58 serve to control the flow velocity of the gas/oil/water mixture 16, caused by the expansion of gas as it rises along the riser tube. The speed of ascension depends on the open cross section of the perforated disks 58. Therefore, the total area and the distribution of the holes in each flow restrictor 58 may be chosen in accordance with a predetermined flow pattern. For instance, the perforated disk 58' of FIG. 6 will restrict the flow to a greater extent than that of FIG. 5, due to the absence of the central opening 60 (see FIG. 5). The flow restrictors are configured in such a way that the resulting flow velocities do not to cause problems to the structural stability of the riser tube 20 and do not prohibit the separation of gas, oil and water in the separator vessel 32 and the open-bottom chamber 30.

Figure 7:
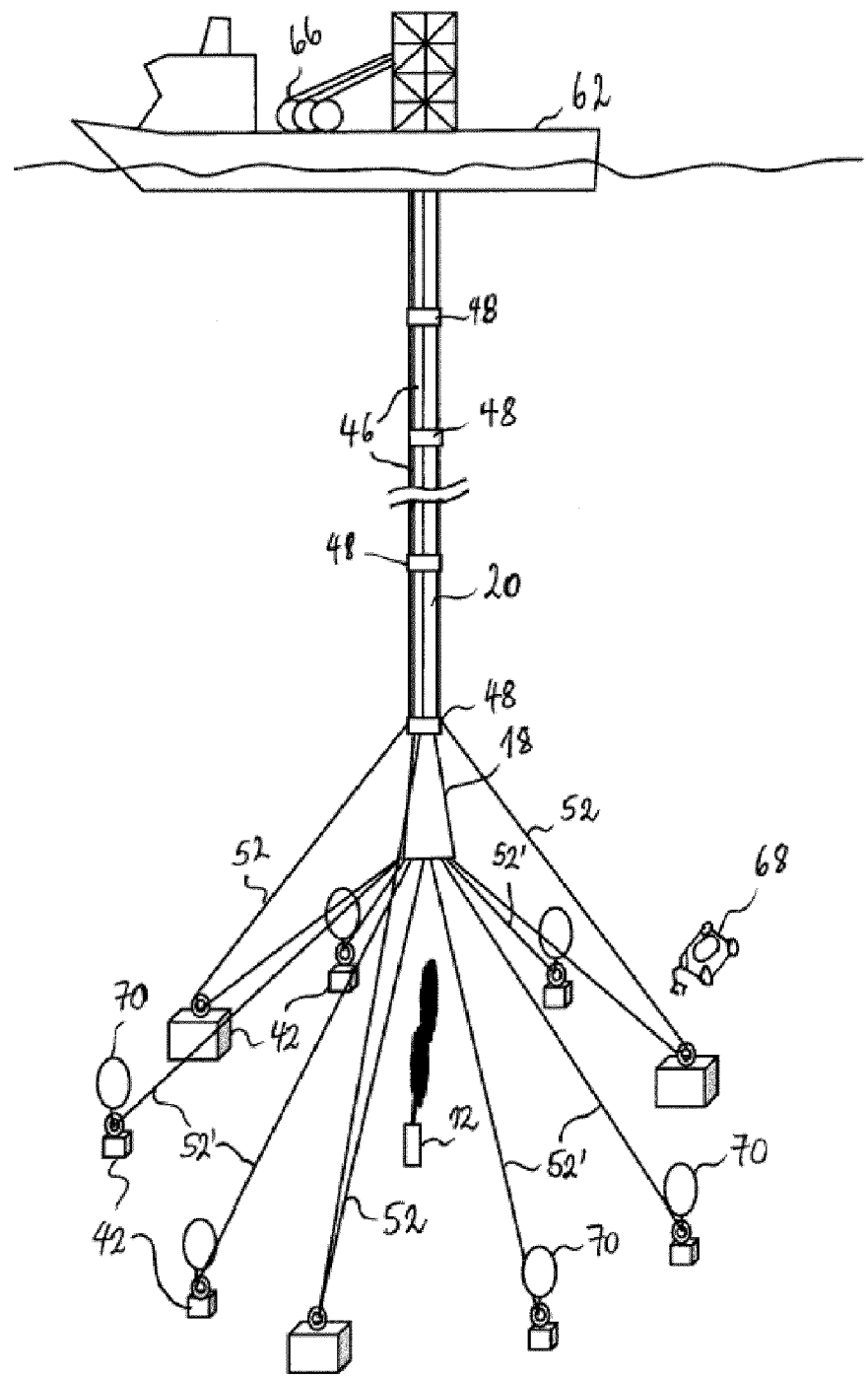
FIG. 7 is a schematic illustration of the installation of the device of FIG. 1.

The device 10 is preferably deployed using the following steps. First, the anchors 42 (e.g. 12 dead weight blocks or suction anchors) are lowered on the seabed by a work vessel 62 (see FIG. 7) equipped with a derrick, a crane or a winch of sufficient lifting capacity. The anchors 42 are arranged about the hydrocarbon source (the borehole 12) in substantially regular intervals on a circle having a predetermined diameter (e.g. 150 m to 200 m). Each of the anchors 42 comprises an eye, a suspension band, or the like, through which a rope can be passed. When the anchors 42 have been put in place, a small number (e.g. 3 to 6) of mooring lines 52 are deployed between selected, regularly spaced anchors and the work vessel 62. The mooring lines are passed through the eyes provided on the anchors using one or more remotely operated vehicles 68 (ROVs). The front ends of the mooring lines are returned to the vessel 62, where they are attached to winches 66. At the sea surface, the unfolded collector 18 is lowered to the water and brought alongside the installation vessel 62. It is connected to the rear ends of the deployed mooring lines 52 and the first, lowermost, section (module) of the riser tube. By operating the winches 66, the unfolded collector 18 is lowered toward the seabed, while being guided and pulled by the mooring lines 52 already in place. The riser tube 20 is then built module by module, each time by placing a connector 48 on top of the previous module 46, after which another tube module 46 is added. When the unfolded collector 18 is a predetermined distance away from the target, the buffer reservoir 22 (not shown in FIG. 7) is connected to the uppermost tube module. The collector 18, the riser tube 20 and the buffer reservoir 22 are then lowered further, in such a way that the buffer reservoir 22 arrives at the predefined depth (about 30-50 m). Additional mooring lines 52' are now disposed between the anchors 42 and the unfolded collector 18, using again one or more ROVs 68. One end of each additional mooring line 52' is connected to the collector 18. The other end is passed through the eye on the corresponding anchor 42 and attached to a lifting bag 70. Finally, the collector 18 is unfolded. This is achieved by pulling on the mooring lines 52' using the lifting bags 70. The lifting bags 70 are preferably simultaneously inflated, so that the collector 18 unfolds substantially centrally above the target.

The device 10 presents many significant advantages. Firstly, it is very simple and does not require precise or elaborate manipulations or operations for its manufacturing or on-site deployment. Many of its components can be manufactured and assembled by non-specialised shipyards. The riser tube configuration is preferably implemented through a modular design, as illustrated in the example, adding operational flexibility and lowering the cost. The device 10 can be operated entirely by non-specialised personnel. Once in place, it does not require regular deep-sea operations or monitoring. The presence the submerged buffer reservoir makes the operations tolerant to rough surface weather conditions. The device is highly configurable, since both the riser tube and the buffer reservoir can be optimised (anchoring parameters, tube and buffer reservoir dimensions, tube/wire tensioning, depth of the buffer reservoir, eventual intermediate buoys etc). Last but not least, due to its flexibility of operation, the device can rapidly be installed in deep sea or shallower waters, and therefore can be a main tool in general intervention procedures to prevent major marine pollutions. Other advantages of the device are that it operation is entirely gravity driven. The device does not require any pumping or other complex operations that are very difficult and expensive at great depth. Furthermore, there is no need for pressure resistant pipes or containers nor for valves or other manipulations at great depths during operation. The technique does not interfere with the well nor does it pose any problems to possible side drills.

At the buffer reservoir, gas is separated and accumulates in the topmost part, where from it may be continuously evacuated towards the surface through special gas relief valves, to be collected or flared. The oil, separated by gravity from the water accumulates in the buffer reservoir, from where it is recovered in batches using standard offshore technology, when the weather permits it. The solicitations and conditions of the whole structure are essentially independent from weather at the surface. The capacity of the buffer reservoir may be chosen in accordance with the circumstances. It may amount to several thousand m$^3$, e.g. preferably between 2500 m$^3$ and 25000 m$^3$.

An important advantage of the system is that it may be installed without any intervention on the hydrocarbon source, e.g. the failed wellhead. The flux towards the surface can be further controlled by intervening all along the riser tube at the metallic junctions of the riser tube components even after the installation, using an ROV.

Thanks, in particular, to the strong anchoring at the seabed, the wide riser tube (diameter is typically about 2 m) and the separator vessel in the buffer reservoir, the device according to the invention can handle large flows of hydrocarbons (e.g. flows that occurred in the Deepwater Horizon accident). The capacity of the buffer reservoir has to be sufficiently high to be able to accumulate the oil and/or gas between the periodic off-loadings. It is expected that methane hydrate should not pose any problems to the system because the water/gas/oil mix can flow upwards right away through the large tube, much less prone to clogging than standard drilling risers. Moreover, the large diameter of the tube provides substantial thermal inertia to account for the cooling of the depressurizing gas. By the mentioned anchoring techniques, the collector may be anchored to the seabed so strongly that it can withstand several thousand tons of buoyancy forces. The tube walls may be made thick enough (77 mm in the above example) to resist against dynamic forces of expanding gas.

While a specific embodiment has been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

LEGEND

- 10 Fluid collecting device
- 12 Underwater borehole
- 14 Blowout preventer stack
- 16 Slurry of oil, gas and water
- 18 Inverted funnel (collector)
- 20 Riser tube
- 22 Buoyant buffer reservoir
- 24 Lower end of riser tube
- 26 Sea surface
- 28 Upper end of riser tube
- 30 Open-bottom chamber
- 32 Oil/gas separator vessel
- 34 Baffle
- 36 Opening
- 38 Gas uptake
- 40 Flare
- 42, 42' Anchor
- 44 Ballast tank
- 46 Tube module
- 48 Connector
- 50 Stabilizing ring
- 52, 52' Mooring line
- 54 Mooring line guide
- 56 Sleeve portion
- 58 Perforated disk (flow restrictor)
- 60 Central opening
- 62 Work vessel
- 64 Tanker wreck
- 66 Winch
- 68 Remotely operated vehicle
- 70 Lifting bag

We claim:

1. A device (10) for collecting and temporarily storing fluids (16) escaping from an underwater source (12, 64) and having lower density than surrounding water, said device comprising:
    a collector (18) for being placed over the underwater source (12, 64) for collecting the fluids (16) escaping from the underwater source (12, 64);
    a riser tube (20) having a lower end (24) in communication with the collector (18) for transferring the collected fluids together towards the surface;
    a buoyant buffer reservoir (22) configured for being maintained submerged at a predetermined depth under the surface (26), the buffer reservoir (22) comprising a chamber (30) with an open bottom for storage of the fluids transferred by said riser tube (20),
    wherein said riser tube (20) has flow restrictors comprising choke disks (58, 58') arranged in its interior for restricting the flow of said fluids, said flow restrictors being arranged at variable or regular intervals all along the length of the riser tube (20) and in that the buffer reservoir (22) has arranged in its chamber (30) a separator vessel (32), into the interior of which said riser tube (20) opens with its upper end (28) for discharging the collected fluids; said separator vessel (32) being configured for separating gas from the fluids discharged by the riser tube (20).

2. The device (10) as claimed in claim 1, wherein said collector comprises a deployable inverted funnel (18), said inverted funnel having an apex opening to which the fluids escaping from the underwater source converge, said apex opening being connected to the lower end (24) of the riser tube (20).

3. The device (10) as claimed in claim 1, further comprising one or more gas offtakes (38) for removing gas from said separator vessel (32) and said chamber (30).

4. The device (10) as claimed in claim 3, comprising a gas holder and/or a flare (40) connected to said offtakes (38).

5. The device (10) as claimed in claim 1, wherein said riser tube (20) has an inner diameter of at least 0.6 m.

6. The device (10) as claimed in claim 5, wherein said inner diameter is comprised in the range from 1.5 m to 2.5 m.

7. The device (10) as claimed in claim 5, wherein said riser tube (20) has an inner diameter of at least 1 m.

8. The device (10) as claimed in claim 1, wherein said riser tube (20) has a length of at least 100 m.

9. The device (10) as claimed in claim 8, wherein said riser tube (20) has a length of at least 200 m.

10. The device (10) as claimed in claim 1, wherein said predetermined depth under the surface (26) is comprised in the range from 20 m to 60 m.

11. The device (10) as claimed in claim 10, wherein said predetermined depth under the surface (26) is comprised in the range from 30 m to 50 m.

12. The device (10) as claimed in claim 1, wherein said separator vessel (32) comprises an oil/gas separator.

13. The device (10) as claimed in claim 1, wherein said riser tube (20) comprises a plurality of tube modules (46) joined to one another by connectors (48).

14. The device (10) as claimed in claim 13, wherein said flow restrictors (58, 58') are arranged on said connectors (48).

15. The device (10) as claimed in claim 13, wherein said tube modules (46) are made of polyethylene.

16. The device (10) as claimed in claim 13, wherein said connectors (48) are made of steel.

17. The device (10) as claimed in claim 1, wherein at least one of said flow restrictors comprises a valve, said valve comprising a first and a second perforated disk arranged coaxially with each other in said riser tube, at least one of said disks being rotatable with respect to the other disk in such a way that the overlap of the perforations of the first and the second disk, respectively, can be varied.

\* \* \* \* \*